(12) United States Patent
Kim et al.

(10) Patent No.: US 10,506,140 B2
(45) Date of Patent: Dec. 10, 2019

(54) CAMERA MODULE AND METHOD OF MANUFACTURING THE SAME

(71) Applicant: SAMSUNG ELECTRO-MECHANICS CO., LTD., Suwon-si (KR)

(72) Inventors: Sang Jin Kim, Suwon-si (KR); Soo Gil Sin, Suwon-si (KR); Young Rok Park, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 15/954,302

(22) Filed: Apr. 16, 2018

(65) Prior Publication Data
US 2019/0320095 A1    Oct. 17, 2019

(51) Int. Cl.
*H04N 5/225*    (2006.01)

(52) U.S. Cl.
CPC .......... *H04N 5/2252* (2013.01); *H04N 5/2253* (2013.01); *H04N 5/2254* (2013.01)

(58) Field of Classification Search
CPC .................................................... H04N 5/2252
USPC .......................................................... 348/373
See application file for complete search history.

(56) References Cited

U.S. PATENT DOCUMENTS

| | | | |
|---|---|---|---|
| 2002/0045368 A1* | 4/2002 | Lin | H01R 43/0235 439/83 |
| 2007/0212061 A1* | 9/2007 | Woo | G03B 17/00 396/529 |
| 2008/0267603 A1 | 10/2008 | Jung et al. | |

FOREIGN PATENT DOCUMENTS

| | | |
|---|---|---|
| KR | 10-2007-0103555 A | 10/2007 |
| KR | 10-0843473 B1 | 7/2008 |
| KR | 10-2010-0104269 A | 9/2010 |
| KR | 10-1022870 B1 | 3/2011 |
| KR | 10-2012-0063237 A | 6/2012 |
| KR | 10-1294419 B1 | 8/2013 |

* cited by examiner

*Primary Examiner* — Joel W Fosselman
(74) *Attorney, Agent, or Firm* — NSIP Law

(57) ABSTRACT

A camera module includes : a housing in which a lens barrel is accommodated; a circuit board fixedly mounted on a lower portion of the housing; and a guide member guiding a fixing position of the housing fixed to the circuit board, wherein the guide member includes a solder ball, formed on the circuit board to protrude in an upward optical axis direction and a guide groove, provided as a groove recessed in the upward optical axis direction in a lower end portion of the housing and into which the solder ball is fitted.

17 Claims, 8 Drawing Sheets

CAMERA MODULE AND METHOD OF MANUFACTURING THE SAME

BACKGROUND

1. Field

The present disclosure relates to a camera module and a method of manufacturing the same.

2. Description of Related Art

Recently, in accordance with the trend for miniaturization and slimness in mobile devices, including cellular phones, it has become important, in the industry, to reduce the sizes of components mounted in mobile devices, and high integration technology has been applied in order to exert a further improved function, together with the miniaturization of components mounted in mobile devices.

Particularly, camera modules adopted in current mobile devices, and the like, have been used in camera phones, personal digital assistants (PDAs), smartphones, laptop computers, and the like, and thus need to have a small size and a high performance image capturing function in accordance with consumer preference.

In more detail, mobile devices such as cellular phones, laptop computers, or the like, have recently been provided with camera modules in which an image capturing element such as a charge coupled device (CCD) image sensor, a complementary metal oxide semiconductor (CMOS) image sensor, or the like, is mounted, and the camera modules as described above have performance similar to that of a general high specification digital camera in accordance with an increase in the number of pixels and improvements in functions thereof.

In such a trend, alignment of a housing and a board constituting the camera module is adjusted by coupling a protrusion and a groove structure, in a process of coupling the housing and the board to each other. However, in such an alignment structure, a manufacturing tolerance or an assembly tolerance is easily generated due to a mechanical coupling structure, and a hole needs to be formed in the board, so that rigidity of the board and utilization of the board may thus be decreased.

SUMMARY

An aspect of the present disclosure may provide a camera module in which coupling alignment of a housing and a board may be improved without forming a hole in the board.

According to an aspect of the present disclosure, a camera module may include: a housing in which a lens barrel is accommodated; a circuit board fixedly mounted on a lower portion of the housing; and a guide member guiding a fixing position of the housing fixed to the circuit board, wherein the guide member includes a solder ball, formed on the circuit board to protrude in an upward optical axis direction and a guide groove, provided as a groove recessed in the upward optical axis direction in a lower end portion of the housing and into which the solder ball is fitted.

According to another aspect of the present disclosure, a method of manufacturing a camera module may include: forming a solder pad on a circuit board; disposing a passive component on the circuit board and applying a solder paste to the solder pad; performing a reflow process on the solder paste; and forming a solder ball from the solder paste and disposing a housing on the circuit board so that a guide groove is disposed in a portion corresponding to a position of the solder ball.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
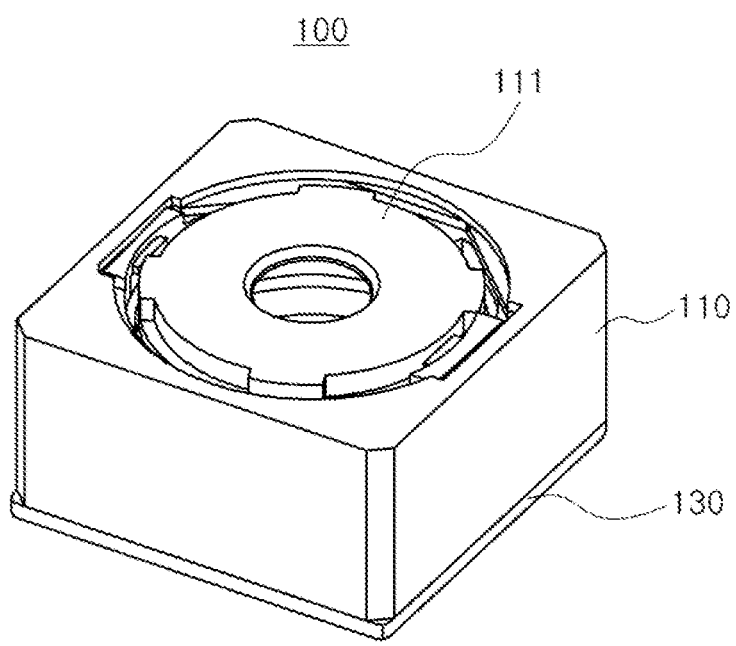
FIG. 1 is a perspective view illustrating a camera module according to an exemplary embodiment in the present disclosure.
Figure 2:
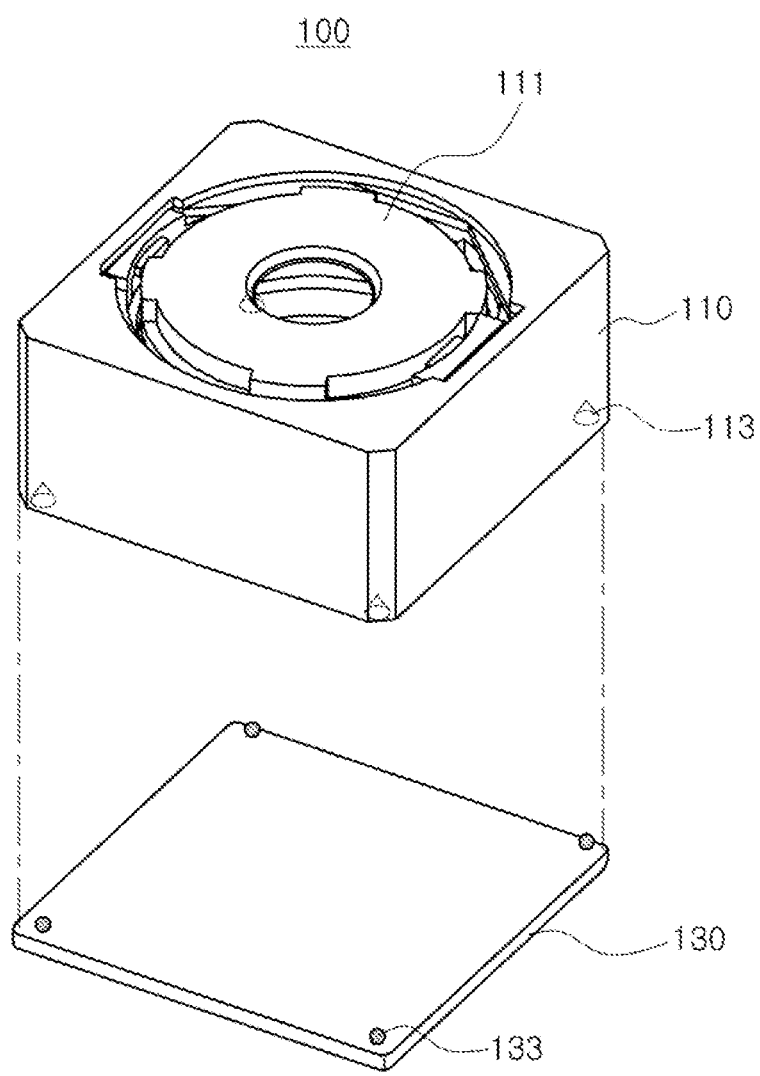
FIG. 2 is an exploded perspective view illustrating the camera module according to an exemplary embodiment in the present disclosure from which a circuit board is separated.
Figure 3:
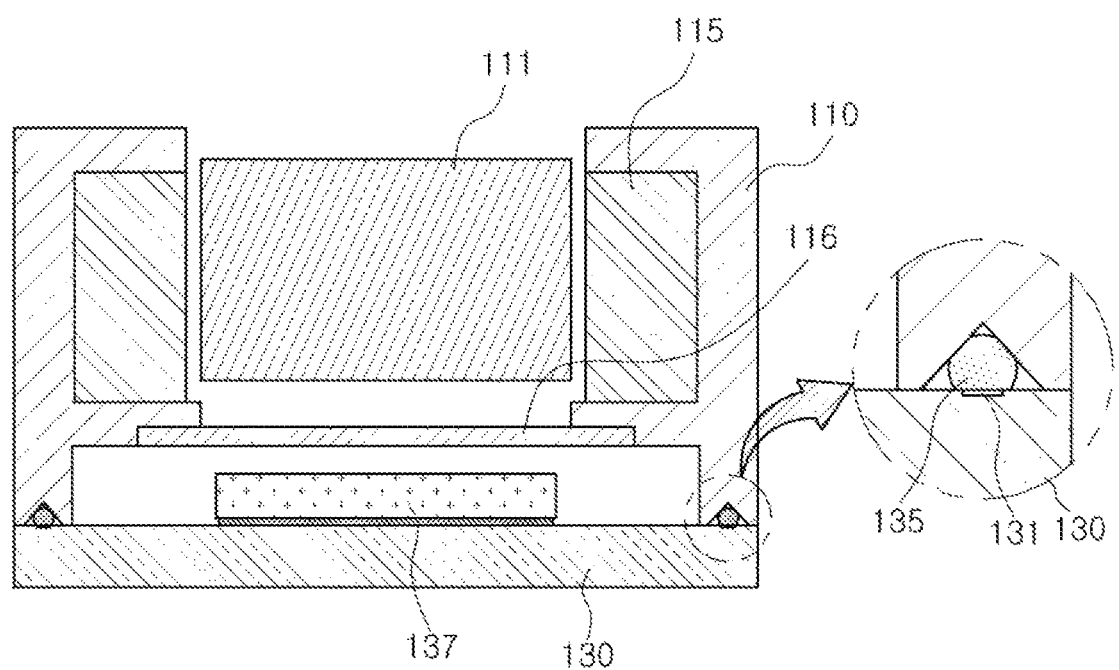
FIG. 3 is an assembled cross-sectional view illustrating the camera module according to an exemplary embodiment in the present disclosure.
Figure 4:
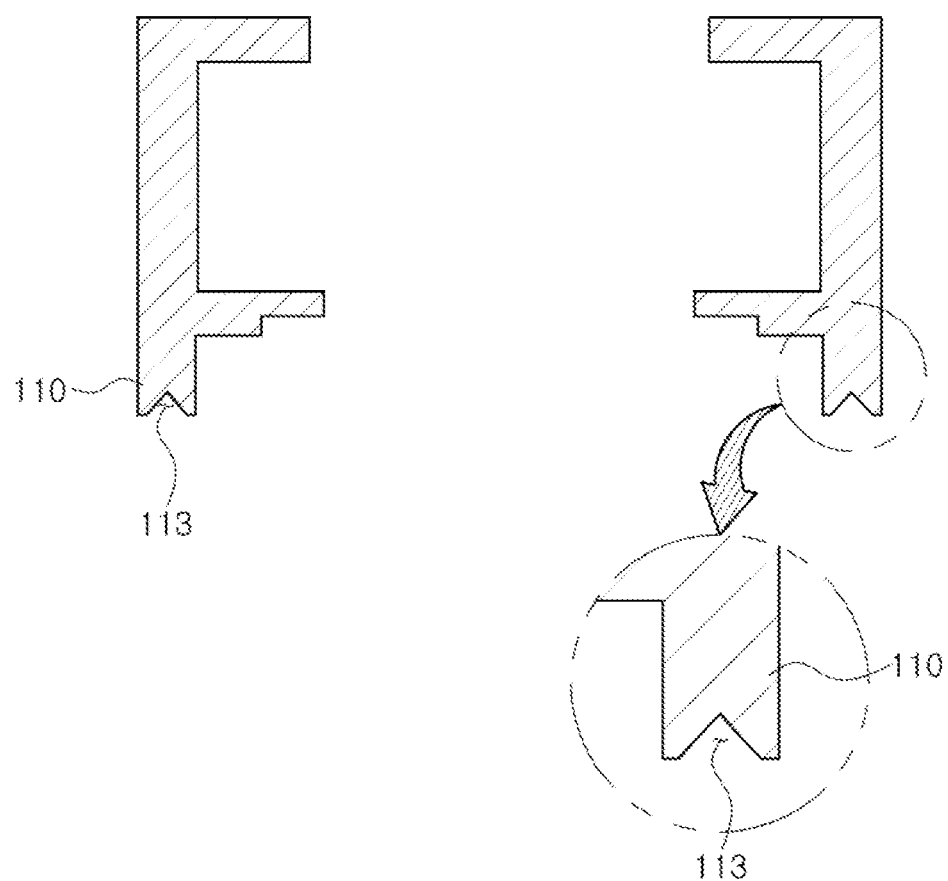
FIG. 4 is a cross-sectional view illustrating a housing of the camera module according to an exemplary embodiment in the present disclosure.

FIG. 1 is a perspective view illustrating a camera module according to an exemplary embodiment in the present disclosure, FIG. 2 is an exploded perspective view illustrating the camera module according to an exemplary embodiment in the present disclosure from which a circuit board is separated, FIG. 3 is an assembled cross-sectional view illustrating the camera module according to an exemplary embodiment in the present disclosure, and FIG. 4 is a cross-sectional view illustrating a housing of the camera module according to an exemplary embodiment in the present disclosure.

A camera module 100 according to an exemplary embodiment in the present disclosure may include a housing 110 in which a lens barrel 111 is accommodated and a circuit board 130 coupled to a lower portion of the housing 110. In addition, the housing 110 and the circuit board 130 may be bonded and coupled to each other by an adhesive such as a thermosetting adhesive, an ultraviolet (UV) adhesive, or the like.

An inner portion of the housing 110 may have a hollow shape, and the lens barrel 111 including at least one lens stacked in an optical axis direction, an actuator performing an autofocusing (AF) function) by driving of the lens barrel 111 in the optical axis direction, an actuator performing an optical image stabilizer (OIS) function by driving the lens barrel 111 in a direction perpendicular to the optical axis direction, an optical filter 116, and the like, may be accommodated in the housing 110.

In addition, an image sensor 137, various passive elements, and the like, maybe mounted on the circuit board 130.

The lens barrel 111 may include a plurality of lenses embedded therein, capture an image of a subject with the image sensor 137 in the camera module 100, and may be screwed to the housing 110 by a screw thread formed on an outer circumferential surface thereof.

The housing 110 may generally support the lens barrel 111, may protect the lens barrel 111 from external impacts, and may be fixedly coupled to the circuit board 130 to protect a component mounted on the circuit board 130, for example, the optical filter 116 such as an infrared (IR) filter, or the like.

Here, a screw groove engaged with the screw thread of the lens barrel 111 may be formed in an inner circumferential surface of a portion of the housing 110 to which the lens barrel 111 is coupled.

The optical filter 116 may be required in order to remove light wavelengths in an infrared region. In more detail, a camera of a camera phone converts light signals into electrical signals using a charge coupled device (CCD) or a complementary metal oxide semiconductor (CMOS) to form an image, and these light signals are sensed in an infrared region (up to 1150 nm) as well as a visible region (400 to 700 nm) that is visible to the human eye, such that signals unrelated to actual colors or images saturate a sensor. Therefore, an infrared (IR)-cut filter may be required in order to remove the light wavelengths in the infrared region.

The image sensor 137 may convert external images into electrical signals and store the electrical signals, and may store the external images instead of an existing film. The image sensor may be divided into a CCD and a CMOS image sensor (CIS). Here, the CCD may be a charge coupled device. In addition, the CIS may use a complementary metal oxide semiconductor (CMOS).

The circuit board 130 may be mounted on the lower portion of the housing 110, and may have electrical circuits, various passive elements, and an integrated circuit mounted thereon in order to transmit and receive electrical signals.

The circuit board 130 may be fixedly coupled to the lower portion of the housing 110. In addition, in a process of coupling the housing 110 and the circuit board 130 to each other, the housing 110 and the circuit board 130 need to be aligned with each other so that optical axes of the lenses stacked in the lens barrel 111 accommodated in the housing 110 and the center of the image sensor 137 mounted on the circuit board 130 coincide with each other, and then fixedly coupled to each other. In other words, the housing 110 and the circuit board 130 need to be fixedly coupled to each other in a state in which they are aligned with each other on the basis of a predetermined position.

Therefore, the camera module 100 according to the present disclosure may include guide members in order to align the housing 110 and the circuit board 130 with each other. The guide members may include solder balls 135 provided on the circuit board 130 and guide grooves 113 provided in the housing 110.

In addition, at least two guide members may be provided along a circumference of a lower end portion of the housing. The camera module 100 according to the present exemplary embodiment illustrated in the drawings may have a rectangular shape, and as an example, the guide grooves 113 may be provided, respectively, in corner portions of the housing 110 having a rectangular shape, and the solder balls 135 may be provided on the circuit board 130 to correspond to the guide grooves 113, such that four guide members may be provided in the camera module 100.

The guide grooves 113 may be provided as grooves recessed in an upward optical axis direction in the lower end portion of the housing 110, and the solder balls 135 may naturally align the housing 110 and the circuit board 130 with each other while being fitted into the guide grooves 113 in the process of coupling the housing 110 and the circuit board 130 to each other.

After the housing 110 and the circuit board 130 are aligned with each other by the solder balls 135 and the guide grooves 113, a process of pressing the housing 110 and the circuit board 130 to each other may be additionally required in order to bond the housing 110 and the circuit board 130 to each other by an adhesive. Therefore, upper portions of the solder balls 135 may be pressed by the guide grooves 113, such that shapes of the upper portions of the solder balls 135 may be changed depending on shapes of the guide grooves 113.

The guide groove 113 may have a conical shape or a polygonal pyramid shape of which a sharp portion is directed in the upward optical axis direction. Therefore, the guide groove 113 may have a diameter that becomes small from the bottom toward the top, and the housing 110 and the circuit board 130 may thus be aligned with each other in a predetermined position while the center of the guide groove 113 and the center of the solder ball 135 are naturally aligned with each other in a process of fitting the solder ball 135 into the guide groove 113.

The solder ball 135 may be formed on the circuit board 130 to protrude in the upward optical axis direction. The solder ball 135 may be naturally formed in a reflow process for soldering the passive elements, the image sensor 137, and the like, mounted on the circuit board 130.

That is, when the passive elements, the image sensor 137, and the like, are mounted on the circuit board 130, solder pads 131 are formed at positions at which the solder balls 135 are to be formed, solder pastes (solder creams) 133 are applied onto the solder pads 131, and the reflow process is then performed, the solder balls 135 may be naturally formed while the solder pastes 133 being melted and hardened. In this case, the solder balls 135 may be easily formed without performing a separate additional process.

In addition, the solder ball 135 formed as described above may basically have a spherical shape, but a seated portion of the solder ball 135 seated on the circuit board 130 may have an approximately circular shape. Therefore, the solder ball 135 may have a dome shape, and a height of the solder ball 135 in the optical axis direction may be greater or smaller than a radius of the solder ball 135 and be smaller than a diameter of the solder ball 135. The solder ball 135 has a spherical shape in a melted state, but may also be hardened in a slight flat spherical shape, that is, an egg shape, by force acting downwardly due to gravity, or the like. In this case, the seated portion of the solder ball 135 may have an approximately oval shape.

Meanwhile, the solder pads 131 may be applied to the circuit board 130 in order to form the solder balls 135. The solder pad 131 may be formed of a metal, and may have a shape in which copper, nickel, gold, and the like, are stacked.

In addition, a shape in which the center of the solder pad 131 is aligned with the center of the guide groove 113 of the housing 110 may be the most accurate alignment shape.

The solder pad 131 may have an approximately circular shape, and may have a size smaller or equal to a diameter of the seated portion of the solder ball 135. In other words, when the solder paste 133 applied onto the solder pad 131 is melted, a spherical liquid-state ball may be formed, and the solder ball 135 may be formed while the spherical liquid-state ball is hardened. In general, the solder pad 131 and the spherical liquid-state ball need to be disposed in a state in which the center of the solder pad 131 and the center of the spherical liquid-state ball coincide with each other, in order to accurately align the solder ball 135 and the guide groove 113 with each other. That is, the solder ball 135 may be formed to cover the entirety of the solder pad 131.

To this end, a size of the solder pad 131 and an amount of applied solder paste 133 may be adjusted so that the solder pad 131 has the size smaller than or equal to the diameter of the seated portion of the solder ball 135. Since the solder pad 131 and an upper surface of the circuit board 130 on which the solder pad 131 is provided have different properties, only when the solder paste 133 is applied around the solder pad 131, the solder ball 135 may be basically formed naturally on the basis of the center of the solder pad 131 in a process of melting and hardening the solder paste 133.

For example, when considering a case in which the solder pad 131 is externally exposed after the solder ball 135 is formed, since the solder pad 131 is very large, in a case opposite to the case described above, since the solder ball 135 is formed on an upper surface of the solder pad 131 having properties that are generally the same as that of the solder ball 135, the solder pad 131 and the solder ball 135 may not be disposed in a state in which the center of the solder pad 131 and the center of the solder ball 135 are aligned with each other, and the solder ball 135 may be formed on any position of the upper surface of the solder pad 131. Therefore, alignment between the housing 110 and the circuit board 130 may become impossible.

Figure 5:
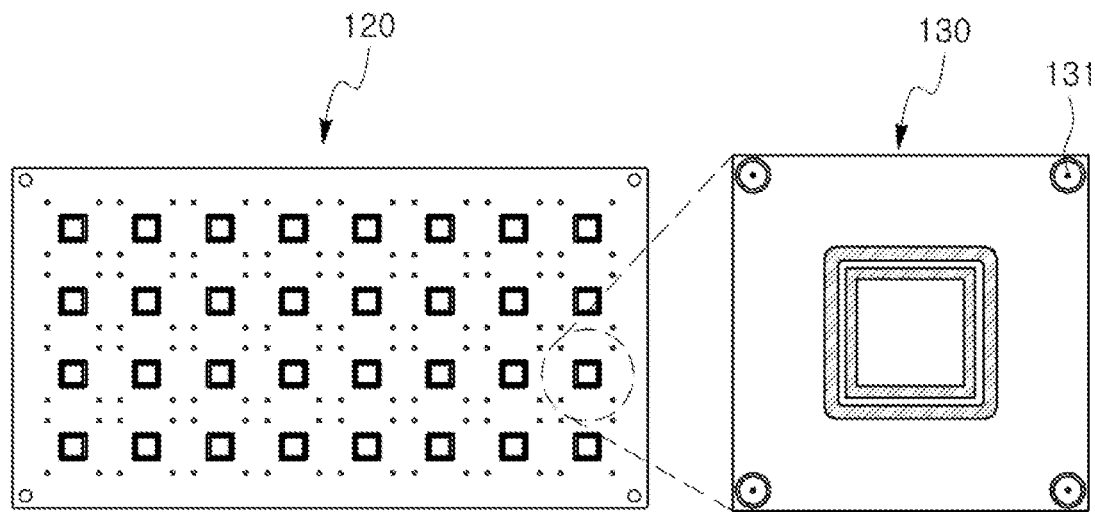
FIG. 5 is views illustrating wafer-level and dice-level circuit boards used to manufacture the camera module according to an exemplary embodiment in the present disclosure.
Figure 6:
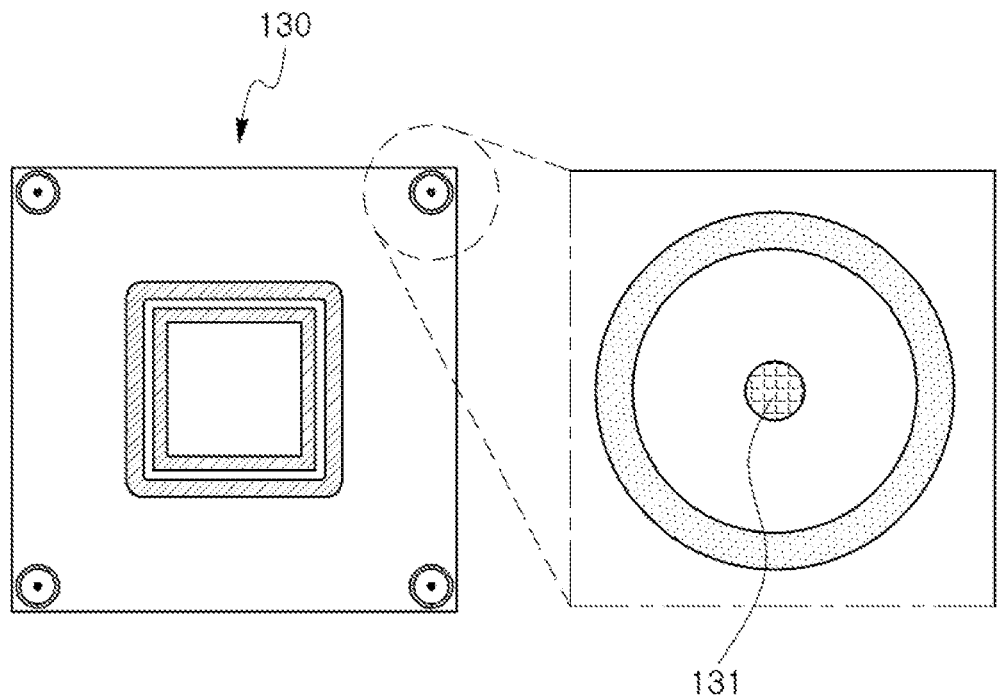
FIG. 6 is a view illustrating a dice-level circuit board used to manufacture the camera module according to an exemplary embodiment in the present disclosure.
Figure 7:
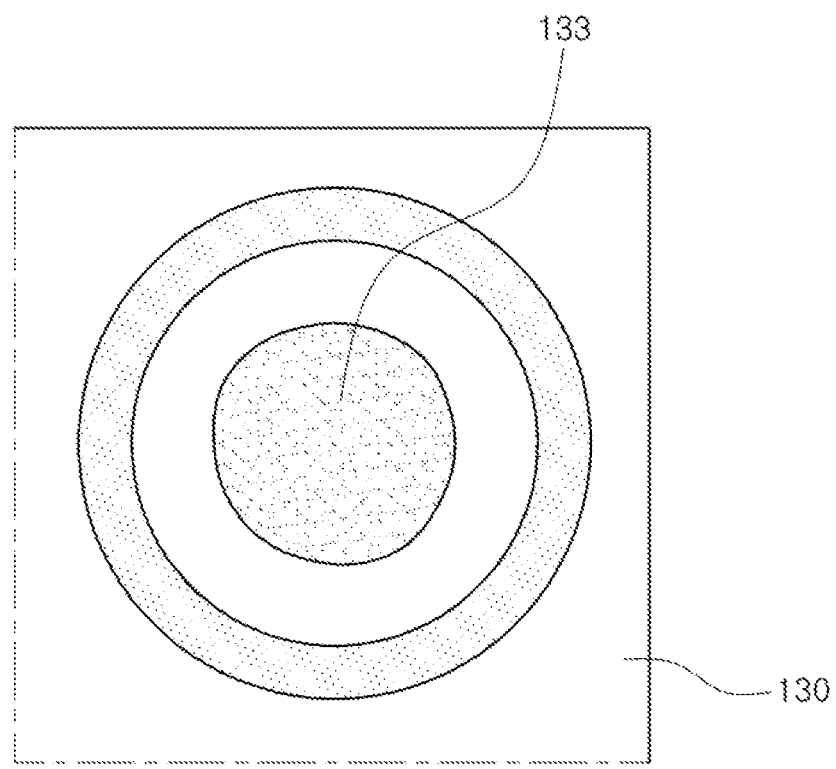
FIG. 7 is a view illustrating a shape in which a solder paste is applied to the dice-level circuit board used to manufacture the camera module according to an exemplary embodiment in the present disclosure.
Figure 8:
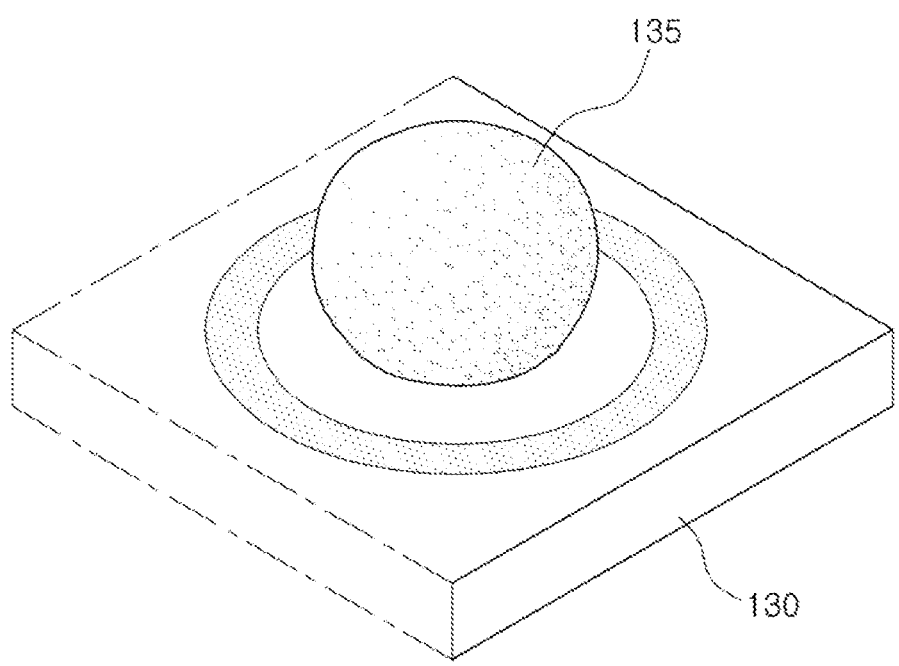
FIG. 8 is a view illustrating a shape in which the solder paste applied to the circuit board used to manufacture the camera module according to an exemplary embodiment in the present disclosure is subjected to a reflow process to form a solder ball.

FIG. 5 is views illustrating wafer-level and dice-level circuit boards used to manufacture the camera module according to an exemplary embodiment in the present disclosure, FIG. 6 is a view illustrating a dice-level circuit board used to manufacture the camera module according to an exemplary embodiment in the present disclosure, FIG. 7 is a view illustrating a shape in which a solder paste is applied to the dice-level circuit board used to manufacture the camera module according to an exemplary embodiment in the present disclosure, and FIG. 8 is a view illustrating a shape in which the solder paste applied to the circuit board used to manufacture the camera module according to an exemplary embodiment in the present disclosure is subjected to a reflow process to form a solder ball.

Referring to FIG. 5, a circuit board used to manufacture the camera module according to the exemplary embodiment in the present disclosure may be a wafer-level circuit board 120. That is, both of a process of mounting the passive components and the image sensors and a process of forming the solder balls may be performed on an integrated circuit board including a plurality of circuit boards each used in a single camera module 100. Then, the integrated circuit board may be diced into dice-level circuit boards 130 to individually provide the dice-level circuit boards 130, and the dice-level circuit board 130 may then be coupled to a single housing 110.

Referring to FIG. 6, the dice-level (single) circuit board 130 used in the camera module according to the exemplary embodiment in the present disclosure is illustrated. It may be seen from FIG. 6 that the solder pads 131 are provided at corner portions of the dice-level circuit board 130 having a rectangular shape.

Referring to FIG. 7, it may be seen that the solder paste 133 is applied to the circuit board 130 used in the camera module according to the exemplary embodiment in the present disclosure, and it may be seen that the solder paste 133 is sufficiently applied so that the diameter of the seated portion of the solder ball 135 is greater than the solder pad 131.

Referring to FIG. 8, an example of the solder ball 135 formed on the circuit board 130 is illustrated.

Figure 9:
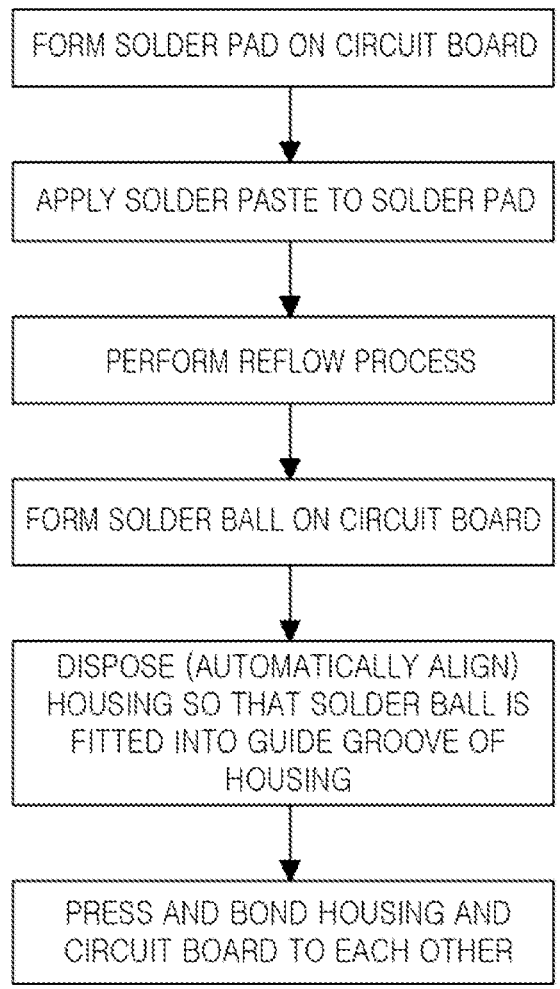
FIG. 9 is a flow chart illustrating a method of manufacturing a camera module according to an exemplary embodiment in the present disclosure.

FIG. 9 is a flow chart illustrating a method of manufacturing a camera module according to an exemplary embodiment in the present disclosure.

Referring to FIG. 9, the method of manufacturing a camera module according to an exemplary embodiment in the present disclosure may include forming the solder pad on the circuit board, disposing the passive component on the circuit board and applying the solder paste to the solder pad, performing the reflow process on the solder paste, and forming the solder ball from the solder paste and disposing the housing on the circuit board, the housing including the guide groove formed at a portion corresponding to a position of the solder ball.

Here, the method of manufacturing a camera module may further include, before the disposing of the housing on the circuit board, applying an adhesive to a lower end portion of the housing or an upper portion of the circuit board, and may further include, after the disposing of the housing on the circuit board, pressing and bonding the housing and the circuit board to each other.

Here, the circuit board may be a wafer-level circuit board, and in coupling the housing to the circuit board, the circuit board may be diced into a dice-level circuit board.

In addition, the guide groove may have the conical shape or the polygonal pyramid shape of which the sharp portion is directed in the upward optical axis direction. Therefore, when the housing is disposed on the circuit board so that the guide groove is disposed on the portion corresponding to the position of the solder ball, the center of the solder ball and the center of the guide groove may be naturally aligned with each other.

In addition, the pressing and bonding of the housing and the circuit board to each other, the upper portion of the solder ball may be pressed by the guide groove of the housing, such that the shape of the upper portion of the solder ball may be changed.

As set forth above, according to the exemplary embodiment in the present disclosure, coupling alignment of the housing and the circuit board may further be improved using a process necessarily included in processes of manufacturing the camera module.

According to the exemplary embodiment in the present disclosure, a hole does not need to be formed in the circuit board, and rigidity of the circuit board and utilization of the circuit board may thus be improved.

While exemplary embodiments have been shown and described above, it will be apparent to those skilled in the art that modifications and variations could be made without departing from the scope of the present invention as defined by the appended claims.

What is claimed is:

1. A camera module comprising:
a housing in which a lens barrel is accommodated;

a circuit board fixedly mounted on a lower portion of the housing; and a guide member guiding a fixing position of the housing fixed to the circuit board, wherein the guide member includes a solder ball, formed on the circuit board to protrude in an upward optical axis direction, and a guide groove, provided as a groove recessed in the upward optical axis direction in a lower end portion of the housing and into which the solder ball is fitted, wherein a solder pad is provided on the circuit board, and the solder ball is provided on the solder pad, and wherein the solder ball is formed to cover an entirety of the solder pad.

2. The camera module of claim 1, wherein at least two guide members are provided along a circumference of the lower end portion of the housing.

3. The camera module of claim 1, wherein the solder pad has an approximately circular shape.

4. The camera module of claim 3, wherein a seated portion of the solder ball seated on the circuit board has an approximately circular shape, and the seated portion has a diameter greater than or equal to that of the solder pad.

5. The camera module of claim 1, wherein the solder ball has a dome shape.

6. The camera module of claim 1, wherein an upper portion of the solder ball is pressed by the guide groove.

7. The camera module of claim 1, wherein the guide groove has a conical shape or a polygonal pyramid shape of which a sharp portion is directed in the upward optical axis direction.

8. The camera module of claim 1, wherein the housing has a rectangular box shape, and the guide members are provided at at least two of corner portions of the lower end portion of the housing.

9. The camera module of claim 1, wherein a passive element or an image sensor is mounted on the circuit board.

10. The camera module of claim 1, wherein the circuit board and the housing are bonded and coupled to each other through an adhesive.

11. A method of manufacturing a camera module, comprising:

forming a solder pad on a circuit board;

disposing a passive component on the circuit board and applying a solder paste to the solder pad;

performing a reflow process on the solder paste to form a solder ball from the solder paste to cover an entirety of the solder pad; and disposing a housing on the circuit board so that a guide groove is disposed in a portion corresponding to a position of the solder ball.

12. The method of claim 11, wherein the circuit board is a wafer-level circuit board, and in coupling the housing to the circuit board, the circuit board is diced into a dice-level circuit board.

13. The method of claim 11, wherein before the disposing of the housing on the circuit board, an adhesive is applied to a lower end portion of the housing or an upper portion of the circuit board.

14. The method of claim 11, wherein an upper portion of the solder ball is pressed by the guide groove of the housing, such that a shape of the upper portion of the solder ball is changed.

15. The method of claim 11, wherein the guide groove has a conical shape or a polygonal pyramid shape of which a sharp portion is directed in an upward optical axis direction.

16. The method of claim 15, wherein a position of the housing is automatically guided when the solder ball is seated to be disposed in the guide groove.

17. A camera module comprising:

a housing in which a lens barrel is accommodated;

a circuit board fixedly mounted on a lower portion of the housing; and a guide member guiding a fixing position of the housing fixed to the circuit board, wherein the guide member includes a solder ball, formed on the circuit board to protrude in an upward optical axis direction, and a guide groove, provided as a groove recessed in the upward optical axis direction in a lower end portion of the housing and into which the solder ball is fitted, wherein a solder pad is provided on the circuit board, and the solder ball is provided on the solder pad, wherein the solder pad has an approximately circular shape, wherein a seated portion of the solder ball seated on the circuit board has an approximately circular shape, and wherein the seated portion has a diameter greater than or equal to that of the solder pad.

* * * * *